United States Patent [19]

Scourtes

[11] 4,144,960
[45] Mar. 20, 1979

[54] APPARATUS AND METHODS FOR AUTOMATICALLY TRANSFERRING ARTICLES FROM A CONTINUOUSLY MOVABLE CONVEYOR TO A WORK STATION

[75] Inventor: George Scourtes, Livonia, Mich.

[73] Assignee: The Allen Group, Inc., Saginaw, Mich.

[21] Appl. No.: 807,036

[22] Filed: Jun. 16, 1977

[51] Int. Cl.² ........................................... B65G 13/02
[52] U.S. Cl. ..................................... 198/339; 198/347
[58] Field of Search ................. 198/339, 347; 269/56, 269/13, 14; 164/323, 324, 325; 209/73, 74 R, 74 M

[56] References Cited

U.S. PATENT DOCUMENTS

| 2,640,580 | 6/1953 | DeBurgh | 198/459 X |
| 2,884,113 | 4/1959 | Converse et al. | 198/346 X |
| 2,956,316 | 10/1960 | Deakins et al. | 164/324 |
| 3,088,197 | 5/1963 | Cargill | 29/791 |
| 3,247,980 | 4/1966 | Mikas | 214/1 BB |
| 3,527,087 | 9/1970 | Converse et al. | 198/339 X |
| 3,631,967 | 1/1972 | Converse et al. | 198/633 X |
| 3,648,819 | 3/1972 | Converse et al. | 198/340 X |

Primary Examiner—Robert B. Reeves
Assistant Examiner—Douglas D. Watts
Attorney, Agent, or Firm—Learman & McCulloch

[57] ABSTRACT

Apparatus and method for automatically transferring articles from a continuously movable conveyor to a work station, and return, the transfer apparatus comprising a carriage mounted alongside the conveyor between the latter and the work station and for reciprocating movements along a path parallel to the movement of the conveyor. The carriage has two article support portions, one of which is adapted to receive an article from the conveyor and move it into the work station, and the other of which is adapted to receive an article from the work station and return it to the conveyor. The conveyor is provided with means for stopping selected articles carried by the conveyor to enable the transfer of articles from and to the conveyor to be effected. The movements of the carriage are controlled in such manner as to ensure the presence thereon of an article in readiness to be transferred to the work station prior to the completion of work performed on a preceding article in the work station.

18 Claims, 20 Drawing Figures

APPARATUS AND METHODS FOR AUTOMATICALLY TRANSFERRING ARTICLES FROM A CONTINUOUSLY MOVABLE CONVEYOR TO A WORK STATION

This invention relates to automatic transfer of an article from a conveyor to a work station at which one or more operations may be formed on the article, following which the article is returned to the conveyor. More particularly, the invention relates to the transfer of articles from a conveyor to a work station, and return, and in such manner that an article requiring treatment in a work station may be removed from the conveyor and located in readiness to be delivered to the work station prior to the completion of treatment of an article previously delivered to the work station. The invention thus provides for a considerable saving in time between the treatment of successive articles at such work station.

The prior art contains many examples of mechanisms for transferring articles from a continuously movable, endless conveyor to a work station for treatment of the article, following which the treated article is returned to the conveyor. Conventionally, the conveyor supports a plurality fo articles for movement past a plurality of work stations which may perform the same or different operations on the articles. Each work station, however, can accommodate only one article at a time. If all of the work stations are occupied, therefore, the untreated articles simply remain on the conveyor and circulate past the work stations until such time as a work station is cleared by the discharge therefrom to the conveyor of a treated article. Following the return to the conveyor of a treated article in a conventional installation, the work station from which the treated article has been discharged remains idle until such time as an untreated article is delivered by the conveyor to a point adjacent the vacant work station for transfer thereto. In an installation of this type, a considerable amount of time can elapse between the discharge of a treated article from a work station and the introduction to such work station of another article to be treated. The efficiency of the system thus is affected adversely.

The treatment operation of operations performed at a work station require a certain amount of time and, of course, the transfer of articles between the conveyor and the work station requires additional time. In prior art installations of the kind referred to, the time between the commencement of treating successive workpieces is the sum of the time increments required to transfer a workpiece from the conveyor to the work station, the time required to treat the workpiece, the time required to transfer the treated workpiece from the work station to the conveyor, and the time required for the conveyor to deliver another workpiece to the position in which it may be transferred to the work station.

The total of the elapsed time between the treatment of successive articles at a given work station thus can be substantial, particularly in those instances in which the conveyor contains a mixture of treated and untreated articles. For example, if a particular work station is intended to perform a specific treatment operation on a workpiece and if there are a number of such work stations along the path of the conveyor, it is possible that, following the return of a treated workpiece from the particular work station to the conveyor, there may be several previously treated workpieces conveyed in succession past the particular work station. In systems of the kind under discussion, the work station will not accept workpieces which already have been given the same treatment to be performed at that work station. As a consequence, a substantial period of time may elapse before an untreated workpiece is presented to the work station. Conventional systems of this type have no means for controlling the amount of elapsed time between the treatment of successive workpieces at a given work station, because there can be no provision for controlling the order or sequence of treated and untreated workpieces on the conveyor.

The transfer of articles between a conveyor and a work station in accordance with the invention utilizes a continuously movable conveyor on which articles are conveyed in succession past a plurality of work stations. Each of the work stations has means forming a pathway along which successive articles may be moved into and out of the work station. The conveyor includes means for stopping a selected article and shifting the stopped article off the conveyor, following which other articles on the conveyor continue their movement.

An article shifted off the conveyor is delivered to a transfer carriage. The transfer carriage has two article support portions, one of which receives an article shifted from the conveyor and the other of which receives from the work station an article which has been treated.

The transfer carriage is mounted for reciprocating movements parallel to the path of the conveyor between first and second positions. Following the reception by the transfer carriage of an article shifted from the conveyor, the carriage is moved from its first or initial position to its second position in which the article supported on the carriage is in register with the pathway leading into the work station, whereupon the article is driven from the carriage into the work station. The carriage then is returned to its initial position in which the carriage is capable of receiving another article from the conveyor and in which the second supporting portion of the carriage is in a position to receive the treated article from the work station.

Upon conclusion of the treatment of the first article in the work station, the treated article is returned to the second supporting portion of the carriage, whereupon the latter is moved from its initial position to its second position in which a second, untreated article supported on the carriage is driven into the work station. Thereafter, the carriage is returned to its initial position so as to enable a third article to be shifted to the carriage and, at the same time, enable the treated first article to be returned to the conveyor.

The sequence of operations thus is such that the carriage, except for the time that it is in transit between its initial and second positions, is in a position to receive and support another article in a rest position in readiness to be delivered to the work station. The transfer of an article from the conveyor to the rest position in which it is in readiness to be treated at the work station thus is not dependent upon the discharge of a treated article from the work station. As a consequence, considerable time savings may be realized with corresponding greater efficiency of the entire system.

The foregoing advantages, and others, of the invention are referred to in the following description and are illustrated in the drawings, wherein.

Apparatus constructed according to the invention includes, as principal components, a continuously movable conveyor 1 for moving a plurality of articles in succession along a path; stop or arrester means 2 for interrupting the movement of selective articles by the conveyor; shifting means 3 for shifting a selected article off the conveyor to one side of the latter and for returning articles to the conveyor; and transfer means 4 for receiving articles moved off the conveyor by the shifting means 3 and for returning articles to the shifting means, as well as for transferring articles to and from a work station 5 at which one or more treatment operations may be performed on the articles. Each of the principal components referred to above will be described under a corresponding heading.

THE CONVEYOR

Figure 4:
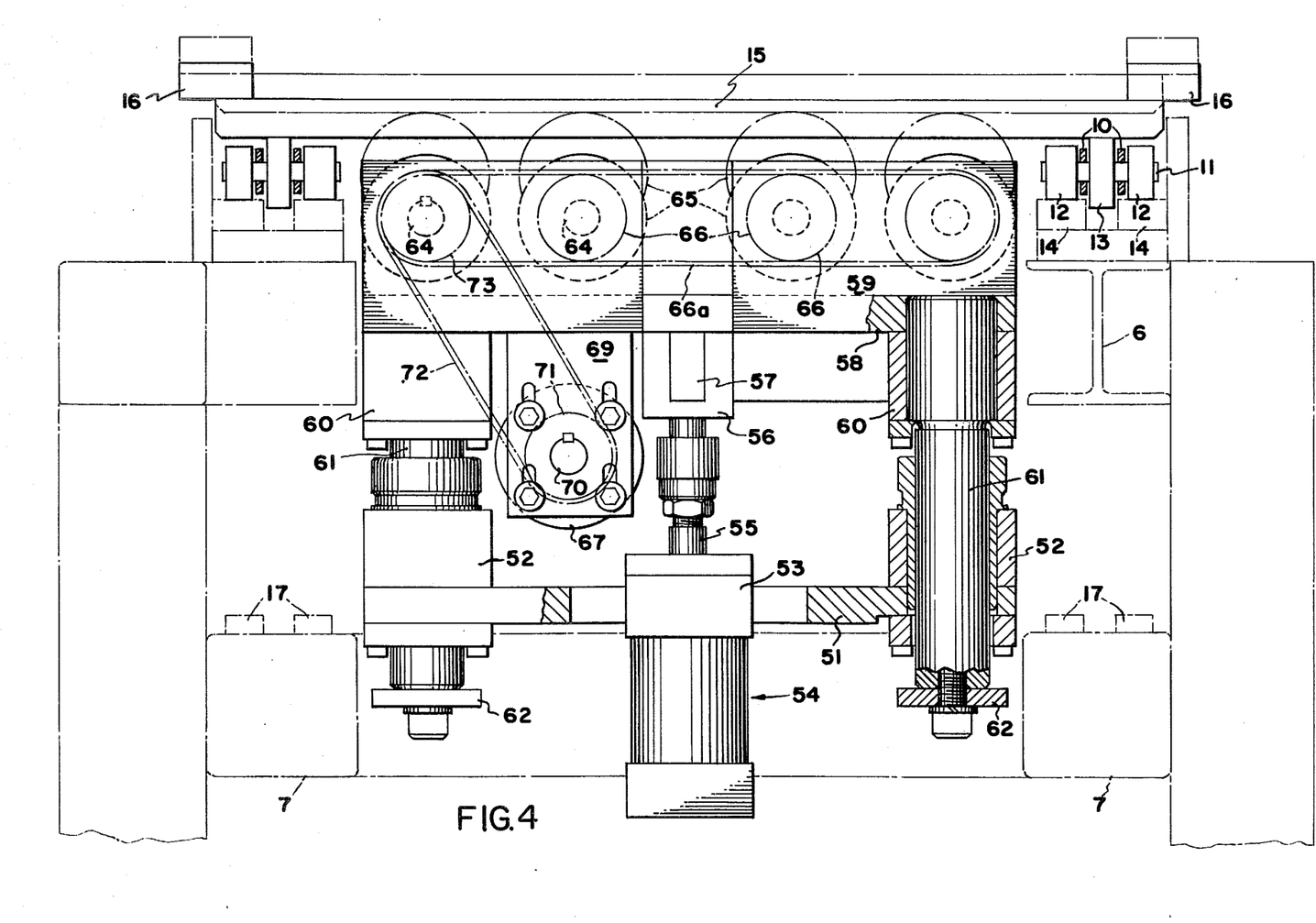
FIG. 4 is a partly elevational view and partly sectional view of article shifting means associated with the conveyor, and taken generally along the line 4—4 of FIG. 1.

The conveyor 1 comprises a main frame having spaced apart upper rails 6 and parallel lower rails 7 (FIG. 4) on which is supported a pair of parallel, endless chains 8, the upper runs of which are driven along a path indicated by the arrow 9 (FIG. 1) by a suitable drive motor (not shown). Each chain 8 is conventional and includes links 10 joined to one another by pins or axles 11 on which are mounted freely rotatable rollers 12 and friction rollers 13. The rollers 13 are rotatable on the axles 11 upon the application of force on the rollers, but in the absence of such force they do not rotate. The friction rollers 13 are of large diameter than the rollers 12 so as to project both above and below the upper and lower surfaces of the rollers 12. As is best shown in FIG. 4, the upper rails 6 are provided with spaced apart track members 14 on which the rollers 12 ride, the spacing between the tracks 14 being sufficient to accommodate freely the rollers 13.

The rollers 13 engage the lower surface of and support an article such as a pallet 15 which preferably is square in plan and has four bumpers 16 clamped to its upper surface. Each bumper projects beyond the associated edge of the pallet. Each pallet 15 is adapted to be fitted with a suitable fixture F (FIG. 9) for supporting a workpiece W.

The lower rails 7 of the conveyor also are provided with spaced apart tracks 17, like the tracks 14, to provide support for the lower runs of the chains 8, the spacing between the tracks 17 being sufficient to accommodate freely the friction rollers 13.

The conveyor chains 8 are driven continuously so that pallets supported on the friction rollers 13 will be conveyed in succession along a path leading to and beyond each of the work stations 5. As long as no resistance is offered to movement of the pallets along the path, the friction rollers 13 do not rotate. If a force is imposed on any one of the pallets to stop its movement along the conveyor path, the conveyor chains 8 will continue to move and the frictional force which normally prevents the rollers 13 from rotating will be overcome, thereby enabling rotation of the rollers 13 along the lower surface of the stopped pallet 15. Pallets following the stopped pallet will continue to be moved by the conveyor until such time as they encounter the stopped pallet, whereupon the succeeding pallets also will be stopped, but the conveyor chains 8 nevertheless will continue to move. A conveyor of this kind normally is referred to as an asynchronous conveyor and is well known in the art.

The bumpers 16 are so constructed and located on the respective pallets 15 that the confronting bumpers of a pair of adjacent pallets will engage one another, thus providing a gap 18 (FIG. 2) between adjacent pallets for a purpose presently to be explained.

THE PALLET STOP MECHANISM

Figure 2:
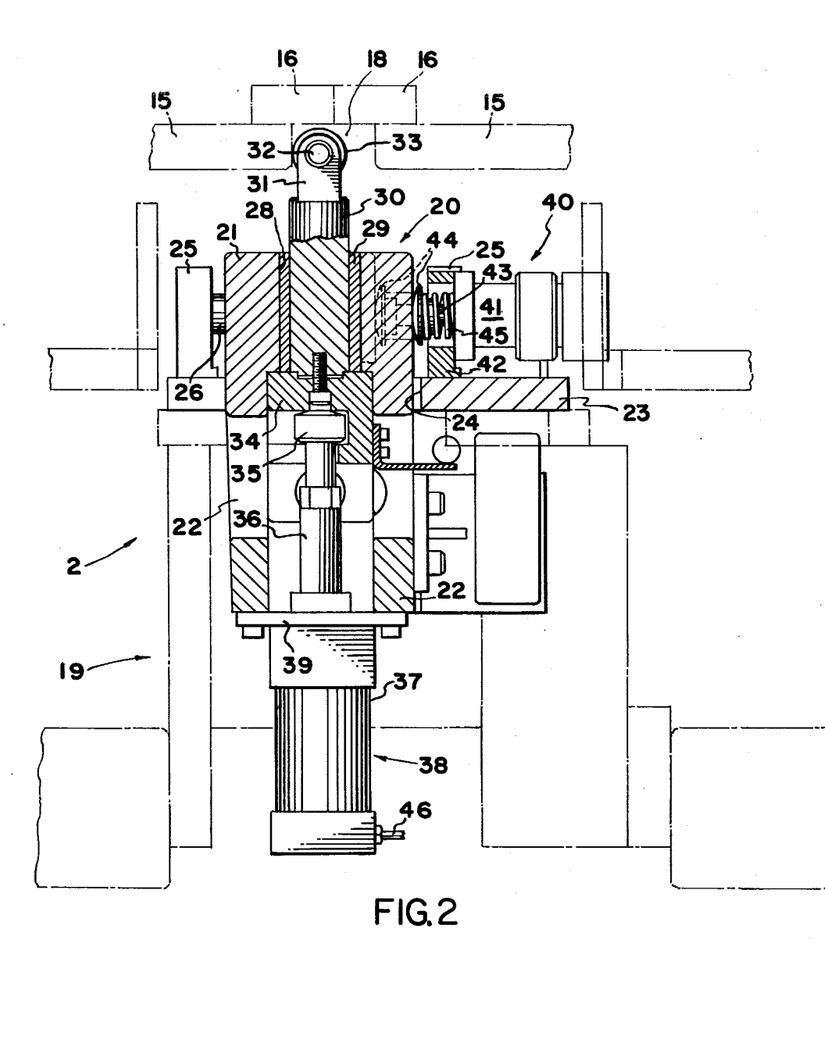
FIG. 2 is an enlarged sectional view taken on the line 2—2 of FIG. 1 and illustrating a stop mechanism for interrupting movement of an article supported on the conveyor.
Figure 3:
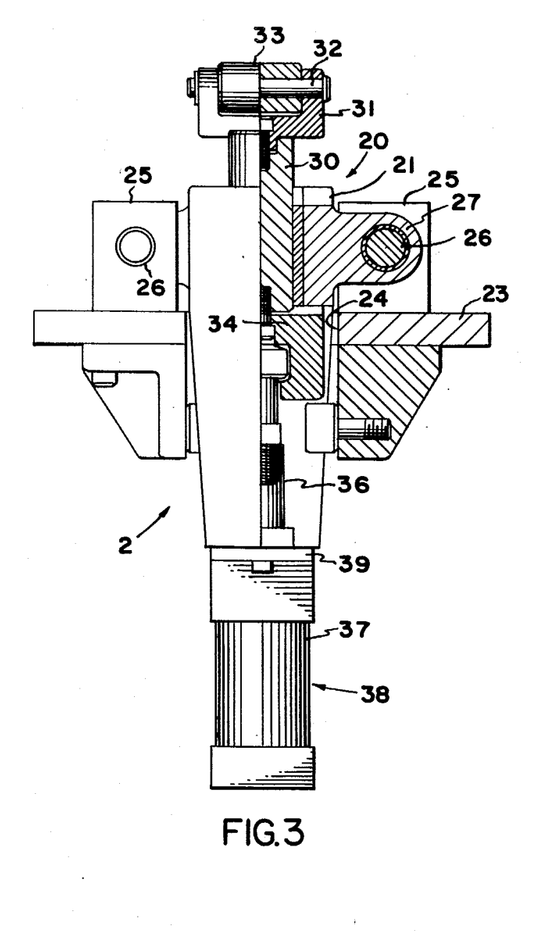
FIG. 3 is a partly sectional view of the stop mechanism illustrated in FIG. 2, but turned through 90°.

The pallet stop mechanism 2 is best illustrated in FIGS. 2 and 3 and comprises a subframe 19 secured to the main frame and including a yoke 20 having a head 21 from which depends a pair of spaced apart legs 22. Atop the subframe 19 is secured a plate 23 having an elongate opening 24 therein through which the yoke 20 extends, the plate 23 mounting upstanding ears 25 in which opposite ends of guide rods 26 are fixed. The guide rods 26 also pass through openings formed in extensions 27 of the yoke head 21 so as to mount the latter for movement longitudinally of the rods 26. The width of the head 21 between the extensions 27 and the spacing between the mounting ears 25 are such as to enable the head 21 to move a short distance to be referred to subsequently.

The head 21 has therein a vertical opening 28 lined with a bushing 29 and within which is a vertically reciprocable rod 30 fitted at its upper end with a yoke 31 that carries a shaft 32 on which is journaled a stop roller 33. The rod 30 is fixed at its lower end to a coupling 34 which is reciprocable between the legs 22 of the yoke 20. The coupling 34 connects the rod 30 to a head 35 fixed at the free end of a piston rod 36 which extends beyond the cylinder 37 of a pneumatic ram 38. The cylinder 37 has a flange 39 which is fixed to the lower ends of the yoke legs 22 by bolts.

The ram 38 constitutes yieldable means for effecting vertical movements of the stop roller 33 from a lowered position in which it lies below the plane of the lower surface of a pallet 15 to an upper position, as shown in FIGS. 2 and 3, in which the roller 33 lies in the path of movement of a pallet 15 for engagement with the leading edge of the pallet to arrest its movement by the conveyor 1.

Associated with the head 21 of the stop mechanism 2 and located downstream of the path of movement of the pallets 15 is a yieldable shock absorbing member 40 comprising a dashpot housing 41 mounted on the plate 23 by an upstanding support 42. Within the housing 41 is a piston (not shown) to which is connected one end of a piston rod 43 terminating at its free end in an enlarged head 44 which is yieldably urged to a projected position by means of a spring 45.

When the stop mechanism 2 is in its inactive position, i.e., when the roller 33 is at a level lower than that of the pallets 15, the shock absorber head 44 is in its projected position, as shown in dotted lines in FIG. 2, so as to maintain the head 21 to the left of the position shown in full lines in FIG. 2. Upon upward movement of the stop roller 33 and its engagement by the leading end of a pallet moving along the conveyor, the momentum of the pallet effects movement of the head 21 a short distance forwardly along the path of movement of the pallet 15, thereby effecting retraction of the shock absorber head 44 to the position shown in full line as in FIG. 2. The shock absorber provides for cushioned deceleration and finally stopping of the movement of the engaged pallet 15. The frictional force exerted on the stopped pallet by the friction rollers 13 is sufficient to maintain the head 21 in the position shown in full lines in FIG. 2.

An important characteristic of the stop mechanism 2 is the yieldability of the means for moving the stop roller 33 to its pallet engaging position. By the utilization of yieldable means, such as the pneumatic ram 38, upward movement of the roller 33 is effected by the introduction of air into the cylinder 37, via a conduit 46, but the air is itself compressible. As a consequence, should the roller 33 engage the bottom of a pallet 15, the engaged pallet will be capable of continuing its movement by means of the conveyor, but the roller 33 will be biased in such manner that it will be projected into the gap 18 between the trailing end of the engaged pallet and the leading end of the next succeeding pallet so as to stop the latter. It is partially for this reason that the bumpers 16 carried by the pallets 15 extend beyond the marginal edges of the pallets. Another reason for extending the bumpers is to avoid metal-to-metal contact between pallets and other parts of the apparatus.

Upon retraction of the stop rollers 33 from engagement with the leading edge of a pallet 15, the shock absorber spring 43 will effect movement of the head 21 to the left from the full line position shown in FIG. 2 so as to condition the apparatus for further operation in connection with a subsequent pallet.

Figure 1:
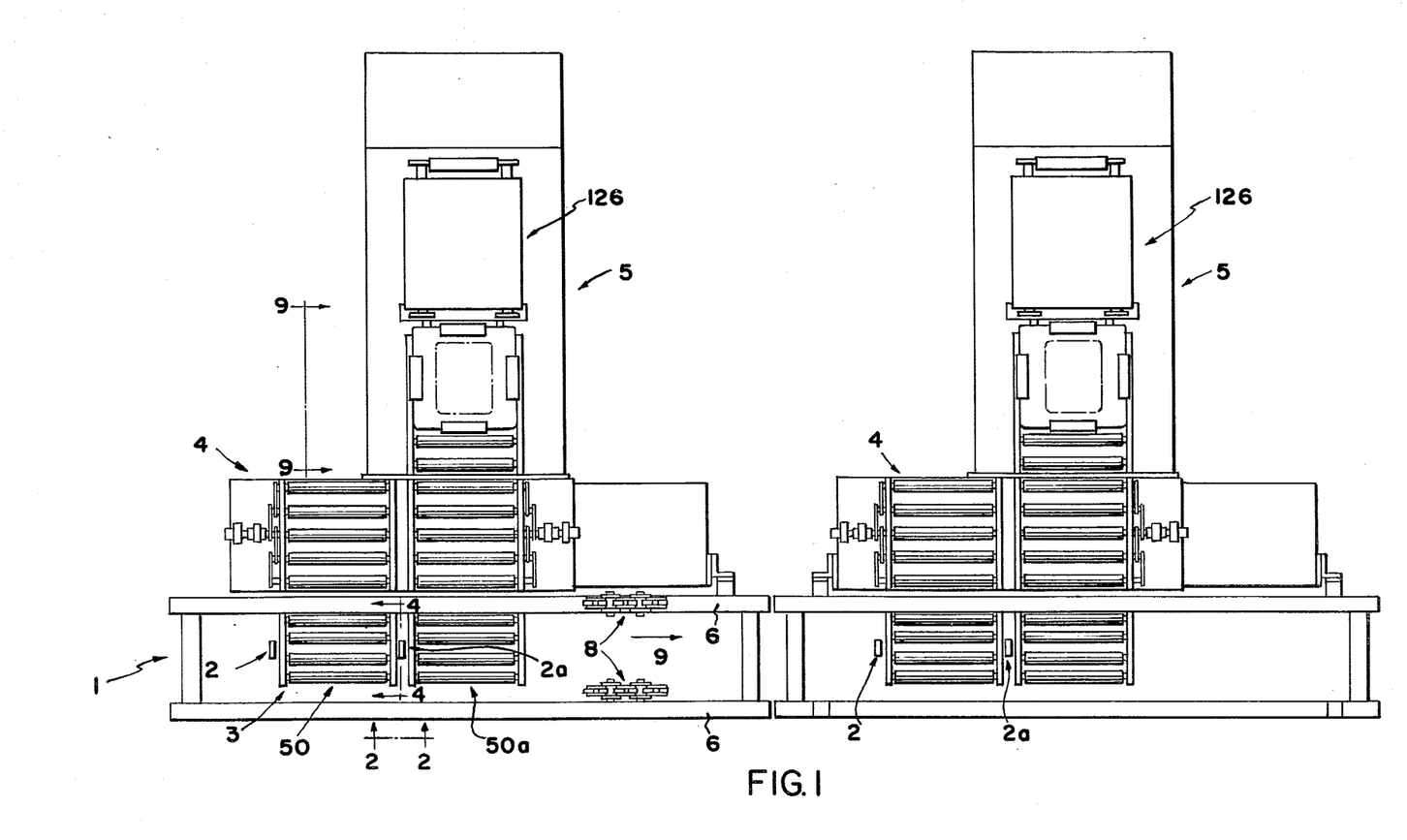
FIG. 1 is a plan view of apparatus constructed in accordance with the invention and illustrating the apparatus in association with a conveyor and two work stations.

As is diagrammatically indicated in FIG. 1, the stop mechanisms 2 are used in pair spaced longitudinally along the path of movement of the pallets 15. For convenience, the upstream stop of each pair is designated 2a, and the downstream stop is designated 2. Each stop mechanism of each pair operates simultaneously, and the spacing between the stop mechanisms of each pair is such as to accommodate a pallet between them with a space between the leading pallet and the immediately following pallet. Those pallets following the immediately trailing pallet will engage the latter and one another so as to accumulate on the conveyor 1.

THE ARTICLE SHIFTING MECHANISM

Figure 5:
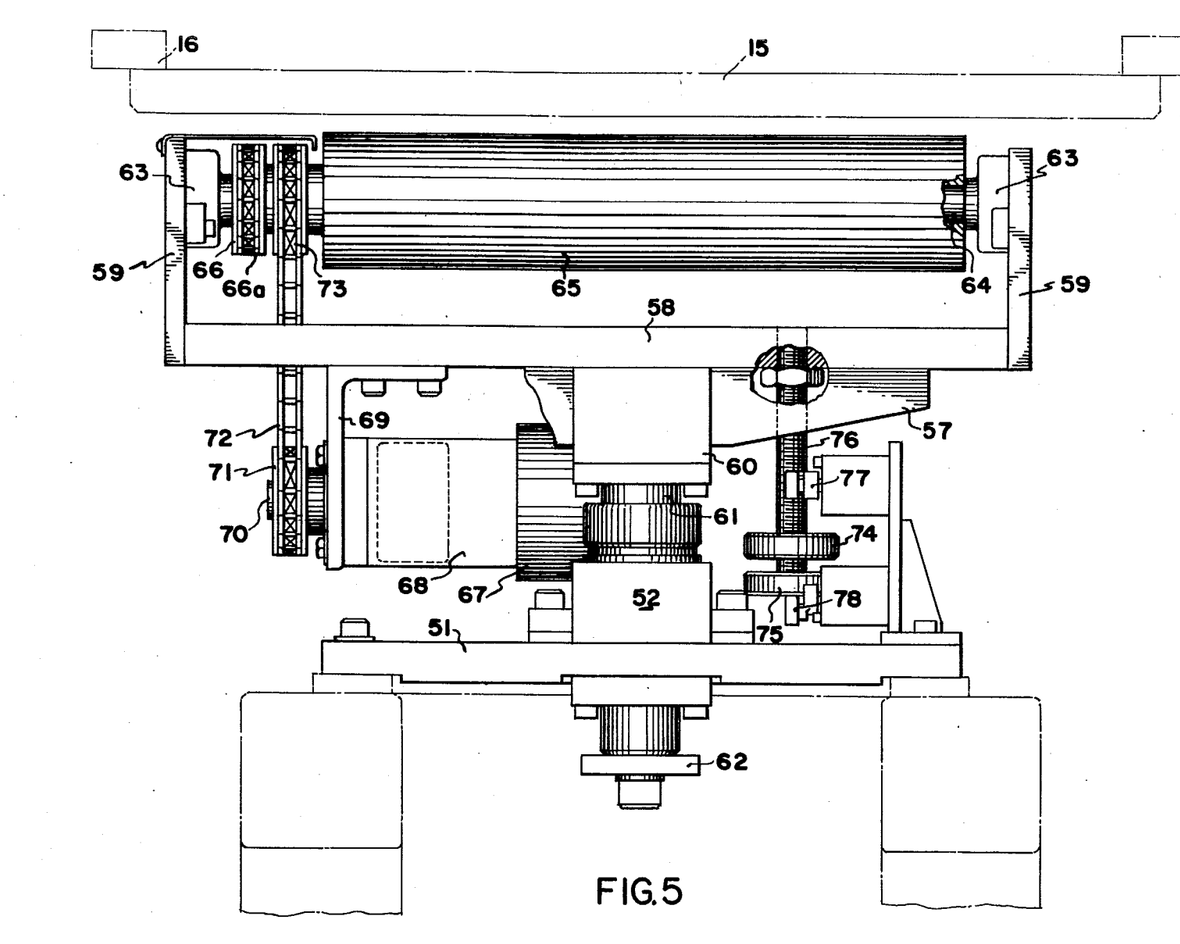
FIG. 5 is an end view, partly in elevation and partly in section, of the apparatus illustrated in FIG. 4 as viewed from the right hand end of the latter.

The shifting mechanism 3 is best illustrated in FIGS. 4 and 5 and comprises an upstream elevator unit 50 and a similar downstream elevator unit 50a associated with the conveyor 1, a pair of such units being located adjacent each work station 5. Each elevator unit comprises a base 51 fixed to the main conveyor frame and having upstanding guide bushings 52 at its opposite ends. Fixed to the base 51 is the cylinder 53 of a pneumatic or hydraulic ram 54 having its piston rod 55 coupled to a fitting 56 carried by a bracket 57 that is fixed to the bottom 58 of a frame having upstanding sides 59. To the bottom 58 of the frame are fixed mounting members 60 in which guide pins 61 are secured, the guide pins passing through the bushings 52 and being equipped with adjustable stop plates 62 at their lower ends.

Journaled in bearings 63 carried by the frame members 59 is a plurality of shafts 64 on each of which is fixed a roller 65. Each shaft has fixed thereto a sprocket 66 and joining each sprocket is a chain 66a so that rotation of any roller 65 is imparted to the remaining rollers.

Means for driving the rollers 65 comprises a hydraulic motor 67 mounted on a speed reducer 68 which, in turn, is fixed to a bracket 69 carried by the frame bottom 58. The speed reducer 68 has an output shaft 70 on which is mounted a drive sprocket 71 around which is trained a driving chain 72 that also is trained around a sprocket 73 mounted on one of the roller shafts 64.

The upstream elevator unit 50 is adapted to lift a pallet 15 off the conveyor 1 and move it onto the transfer carriage 4. The downstream unit 50a is adapted to receive a pallet from the transfer carriage 4 and return it to the conveyor 1. The driving motors 67 for the respective units 50, 50a therefore should be so arranged that the rollers are driven in the proper and opposite directions to accomplish the desired movements of the pallets.

Except when the elevator units of the shifter mechanism are activated to shift a pallet 15 from or to the conveyor 1, each unit normally occupies a lowered position, as shown in FIG. 5, wherein the uppermost surfaces of the rollers 65 are located below the plane of the lower surface of the pallets 15. Upon actuation of the ram 54, however, the roller mounting frame is displaced upwardly a distance sufficient to enable the rollers 65 to engage the lower surface of the pallet 15 and lift it off the friction rollers 13 of the conveyor 1, as indicated in chain lines in FIG. 4. In the elevated position of the frame, therefore, rotation of the rollers 65 of the elevator unit 50 will move the elevated pallet off and to one side of the conveyor.

Operation of the driving motor 67 is controlled by a pair of switch operators 74 and 75 (FIG. 5) adjustably mounted on a post 76 carried by the roller frame bottom 58. Upon upward movement of the frame the operator 74 engages a switch actuator 77 to energize the driving motor 67. Upon lowering of the frame, the operator 75 engages a switch actuator 78 to deenergize the motor 67.

THE TRANSFER CARRIAGE

Figure 6:
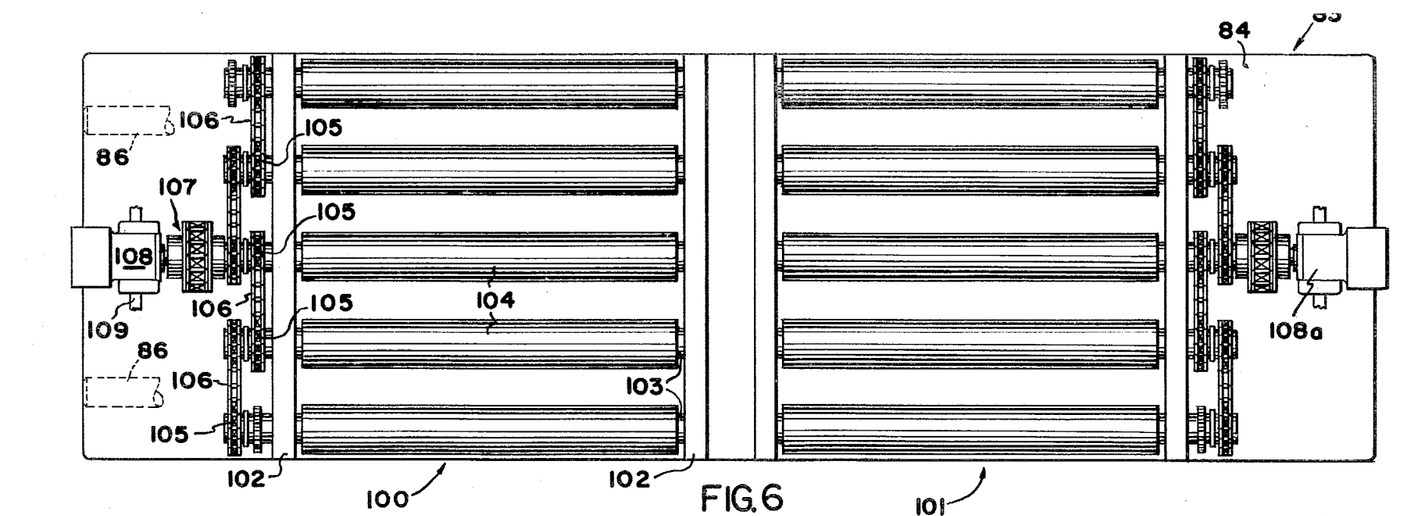
FIG. 6 is an enlarged plan view of a transfer carriage adapted to be interposed between the conveyor and each of the work stations.
Figure 7:
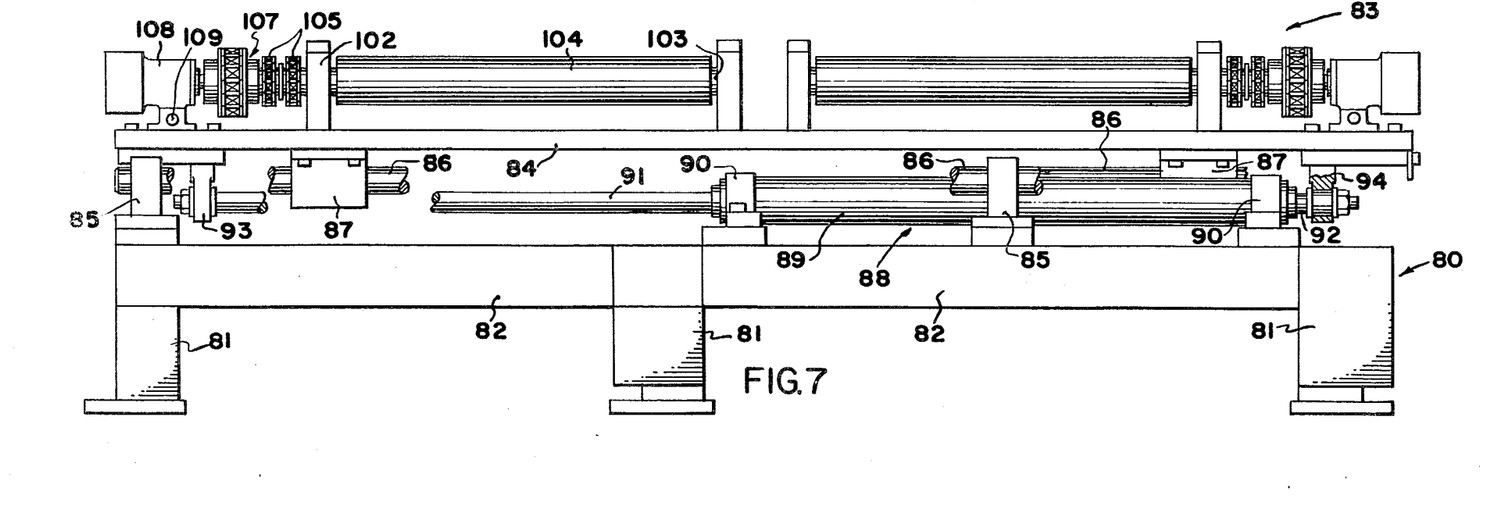
FIG. 7 is a side elevational view, with parts broken away, of the apparatus as shown in FIG. 6.
Figure 8:
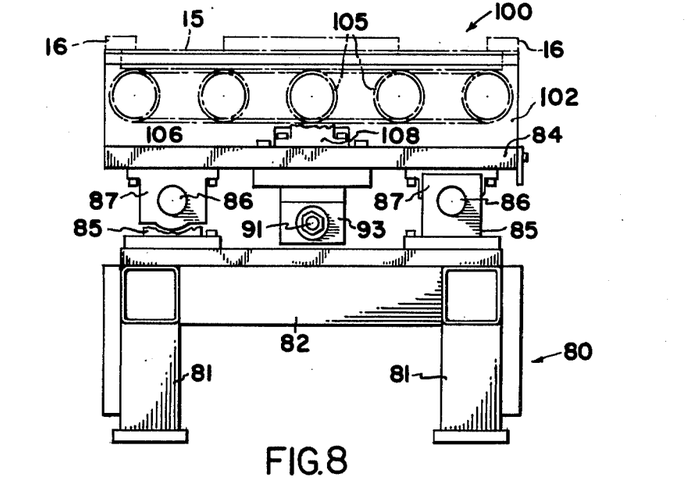
FIG. 8 is an end elevational view of the apparatus shown in FIGS. 6 and 7, with parts broken away.

The transfer carriage 4, best shown in FIGS. 6-8, comprises a main frame 80 having upright members 81 supporting horizontal members 82. Mounted on and above the frame 80 is a carriage assembly 83 comprising a bed or platform 84, the carriage assembly being located adjacent the conveyor 1 and being reciprocable parallel to the path of movement of the pallets 15. The mounting means for the platform 84 comprises a plurality of bearing blocks 85 supported on the horizontal frame members 82 and in which is secured a pair of guide rods 86. Fixed to the lower surface of the platform 84 is a plurality of bushings 87 in which the guide rods 86 are slidably accommodated. Means for reciprocating the carriage assembly 83 comprises a double-acting ram 88 having a cylinder 89 clamped in brackets 90 fixed to the frame member 82. The ram includes a piston (not shown) within the cylinder and to which is connected a pair of opposed piston rods 91 and 92. The free end of the piston rod 91 is fixed to a bracket 93 that is carried by and depends below the platform 84, and the free end of the piston rod 92 is fixed to a similar bracket 94 which similarly is carried by the platform 84.

The construction and arrangement of the carriage assembly thus far described are such that the introduction of pressure fluid to the left-hand end of the cylinder 89 (as viewed in FIG. 7), will cause the platform 84 to move to the right from its initial position to a second position and along a path parallel to the path 9 of movement of the pallets 15 on the conveyor 1. The platform 84 may be returned to the initial position shown in FIG. 7 by the introduction of pressure fluid to the right-hand end of the cylinder 89.

The carriage assembly 83 includes two spaced apart pallet supporting sections or portions 100 and 101. Each of the two sections is substantially similar. Thus, similar reference characters denote similar structure; the difference between the two sections will be pointed out subsequently.

The section 100 has spaced apart, parallel rails 102 in which is journaled a plurality of shafts 103 to each of which is fixed a roller 104. Each shaft has fixed thereto at least one sprocket wheel 105 and the sprockets of adjacent rollers are coupled by a sprocket chain 106 so that rotation of one roller is imparted to all rollers. One of the shafts 103 is connected, by means of a coupling 107, to a hydraulic motor 108 supplied with hydraulic fluid from a source (not shown) via hydraulic lines 109.

As mentioned above, the support section 101 has components constructed and arranged similar to those described in connection with the support section 100. The principal difference between the two sections 100 and 101 is that the motor 108 associated with the section 100 drives the rollers 102 in one direction and the motor 108a associated with the section 101 drives its rollers in the opposite direction.

The rollers 104 of the sections 100, 101 are mounted at such level that they lie in the same plane as the upper surfaces of the rollers of the shifter mechanism 3 when the rollers of the shifter mechanisms are in their elevated positions. Thus, when the carriage assembly 83 is in the position shown in FIG. 1, a pallet 15 on the upstream shifter element 50 may be received by the section 100 and a pallet on the section 101 may be transferred to the downstream shifter mechanism 50a.

THE WORK STATION

Figure 9:
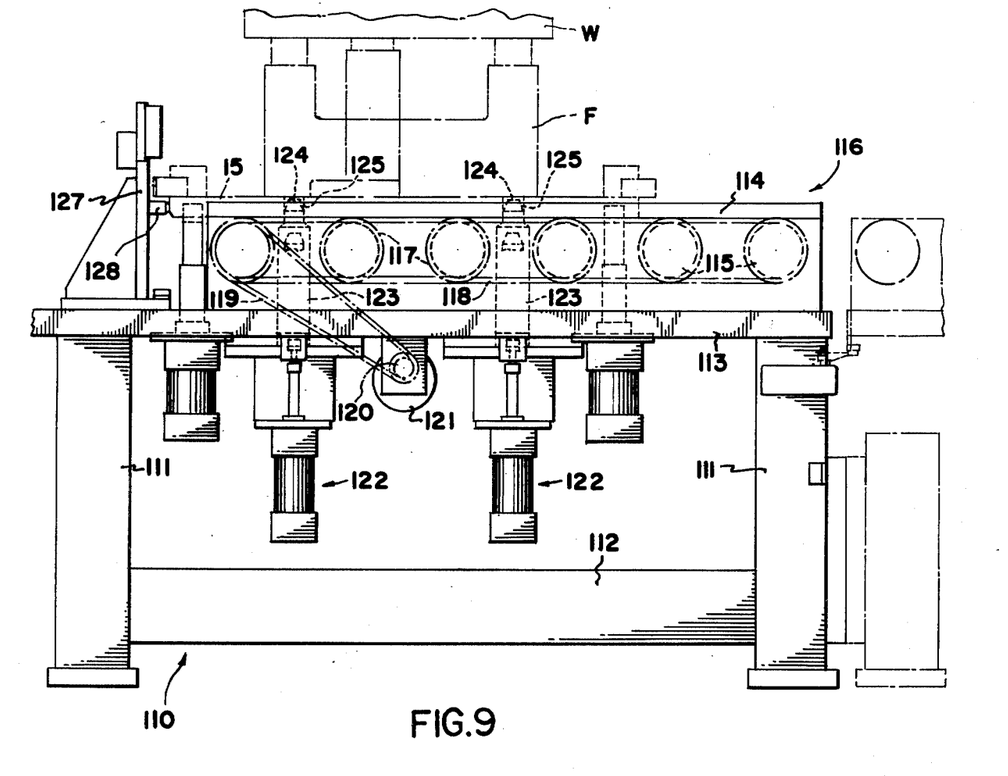
FIG. 9 is a side elevational view illustrating a portion of a work station as viewed in the direction of arrows 9—9 of FIG. 1.

The work station 5 is best shown in FIG. 9 and comprises a supporting frame 110 having a vertical and horizontal members 111 and 112, respectively. Supported on the frame is a horizontal plate 113 to which is fixed a pair of upstanding, parallel, spaced apart rails 114 spanned by a plurality of rollers 115 similar to the rollers 104. The rails 114 and the rollers 115 define a pathway 116 leading into and out of the work station.

Each of the rollers 115 includes a sprocket 117 engaged by a chain 118 to effect simultaneous rotation of the rollers 115 via a chain 119 trained around a sprocket 120 fixed to the output shaft of a reversible hydraulic motor 121. The rollers 115 are mounted by the rails 114 at such level that their upper surfaces lie in the same plane as the upper surfaces of the rollers 104 of the mechanism 4 so as to enable a pallet to be transferred from the transfer mechanism to the pathway 116 and vice versa.

At that end of the pathway 116 remote from the transfer mechanism 4 is a stop member 127 having an actuator 128 of known construction located in the path of movement of a pallet 15. Fitted to the lower surface of the plate 113 is a pair of pressure fluid rams 122 each of which has its piston rod connected to a vertically reciprocable rod 123, the upper end 124 of which is tapered. The actuator 128 is coupled in a known manner to the rams 122 so that, upon engagement of the actuator 128 by a pallet 15, the rams 122 are actuated to move the rods 123 upwardly and locate the tapered ends 124 in openings 125 formed in each pallet 15. A pallet 15 thus may be rigidly locked in position in the work station until such time as the rods 123 are retracted.

Mounted on the frame 110 of the work station is apparatus 126 (FIG. 1) adapted to perform one or a plurality of predetermined treatment operations on the workpiece W. The particular treatment operations performed at the work station 5 are immaterial insofar as the scope of this disclosure is concerned, but it will be understood that the operation or operations performed at each work station 5 may be the same or different.

OPERATION

The operation of all major components of the apparatus, other than the conveyor 1, may be controlled manually, but it is preferred that the operation be automatically controlled by electrical switches located in positions to be engaged by actuators carried by the pallets, the workpieces, or a combination thereof. Such actuators are adjustable in the sense that, following the completion of one or more operations on a given workpiece, the associated actuator or actuators are moved to a position in which they are incapable of engaging the control switches which would be engaged by the actuators associates with untreated workpieces, thereby avoiding moving a treated workpiece into a work station at which the operations already performed on such workpiece would be repeated. Such control switches and actuators are well known in the art and, therefore, are not specifically shown in the drawings.

The operation of the apparatus herein disclosed most easily may be understood by reference to FIGS. 10–20. At the commencement of the operation, the conveyor 1 operates continuously so as to convey pallets 15 one after another along the path 9 which leads to and beyond each work station 5. The pallets may be loaded on the conveyor 1 either manually or automatically.

Figure 10:
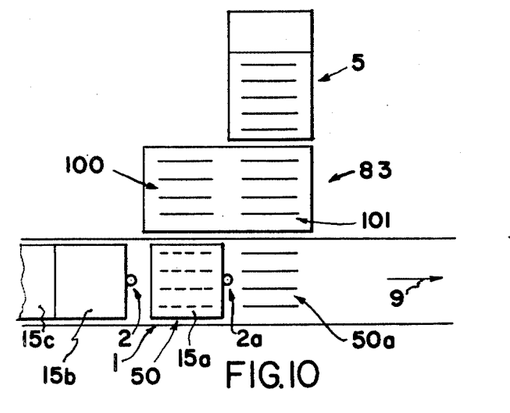
FIGS. 10–20 are diagrammatic plan views illustrating the sequence of operations in shifting successive articles from a conveyor, transferring them to the work station, and returning such articles to the conveyor.

Referring first to FIG. 10, it will be assumed that all work stations 5 are empty, i.e., they contain no articles to be treated, that the pallet 15a is the first pallet on the conveyor 1, and that the pallet 15b is the second pallet on the conveyor. As the pallet 15a approaches the vicinity of the first work station 5, a switch actuator on the pallet 15a (or on the workpiece supported thereby) will engage a switch adjacent the conveyor whereupon the ram 38 will be actuated to project the downstream stop member 2a upwardly into the path of the pallet 15a. The upstream stop member 2 simultaneously will be projected upwardly into the path of the immediately following pallet 15b. The pallets 15a and 15b will be stopped, but the conveyor 1 will continue to move so as to enable a following pallet 15c and others to accumulate upstream of the stop 2a.

The downstream stop 2a will be displaced to the right, as permitted by the shock absorber 40, and operation of the shock absorber 40 will close a switch to actuate the rams 54 and effect simultaneous upward movement of each of the shifters 50, 50a thereby elevating the pallet 15a above the conveyor 1. Upward movement of the shifter 50 closes a switch to energize simultaneously the drive motor 67 associated with the shifter 50 and the motor 108 associated with the transfer section 100 to drive the pallet 15a off the conveyor 1 and onto the transfer section 100. When the pallet 15a has been shifted onto the transfer section 100, it engages a switch which stops the drive motors 67 and 108 and engages another switch which deenergizes the rams 54 to cause the shifters 50 and 50a to be lowered. Lowering of the shifters engages the switch which deenergizes the rams 38 of the stops 2, 2a, thereby enabling both of the stops to be retracted, whereupon the pallets 15b, 15c, and all the following pallets to resume their movement along the path 9.

Figure 11:
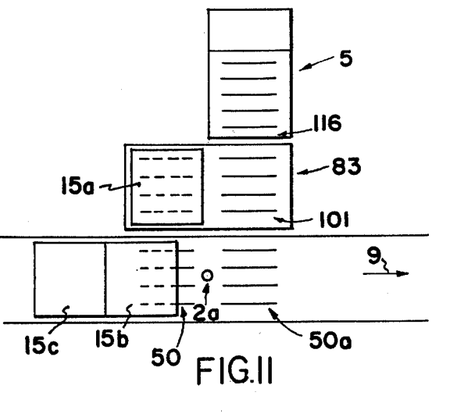
Figure 12:
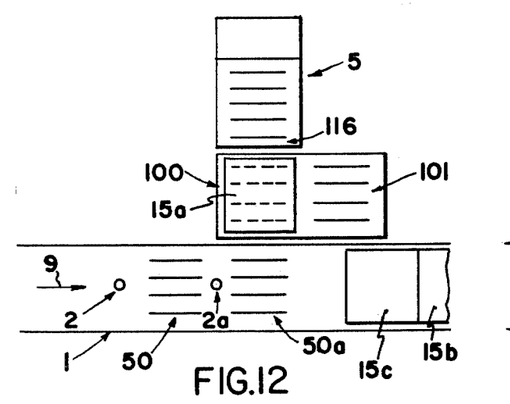
Figure 13:
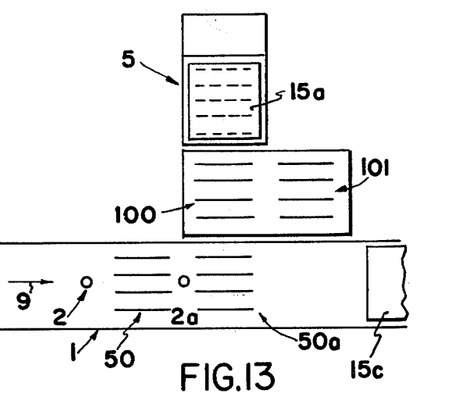

The movement of pallet 15a into position on the transfer section 100 closes another switch which enables the carriage ram 88 to be energized, thereby moving the carriage assembly 83 from its initial position upstream from the pathway 116 as shown in FIGS. 10 and 11 to its second position shown in FIG. 12 in which the pallet 15a is in register with the pathway 116 leading into the work station 5. Movement of the carriage assembly 83 to this position enables the platform 84 to engage a switch to energize both of the motors 108 and 121 to drive the rollers 104 of the section 100 and the rollers 115 of the work station in such direction as to move the pallet 15a into the work station, as is indicated in FIG. 13.

During the movement of the carriage 83 and the delivery of pallet 15a into the work station, pallets 15b and 15c will continue their movement along the conveyor path for introduction into other work stations.

As long as the transfer carriage 83 is in any position other than its initial position as indicated in FIG. 10 it is not possible for a pallet on the conveyor to be stopped in a position to be shifted to the transfer carriage. This result is achieved by the provision of a switch in circuit with the control for the stops 2, 2a and which is opened when the transfer table 84 is in any position other than its initial position.

Figure 14:
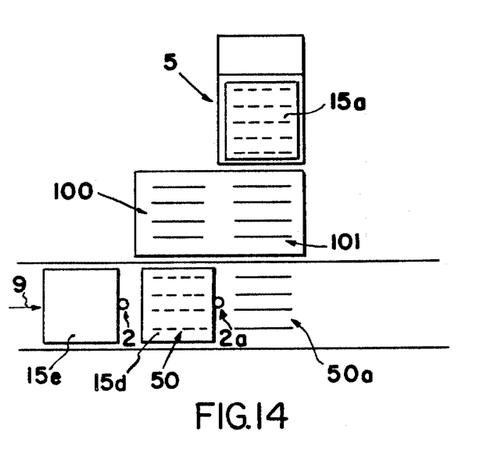
Figure 15:
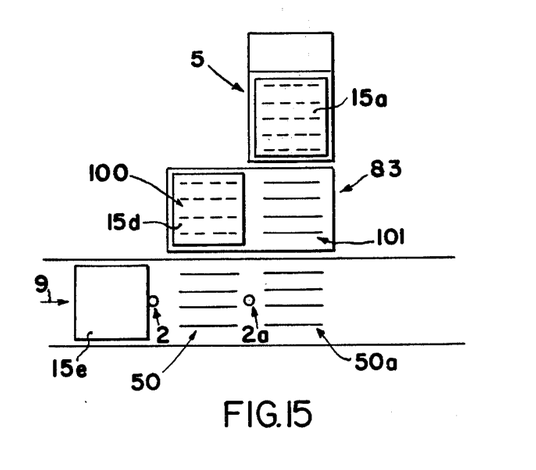

When the pallet 15a is positioned in the work station 5, it engages and closes a switch which effects energization of the ram 88 to return the carriage assembly 83 from the position shown in FIG. 12 to the initial position as shown in FIG. 14. Upon return of the carriage assembly to its initial position a pallet 15d containing an untreated workpiece and delivered by the conveyor 1 to the position adjacent the transfer section 100 will be acted upon in the same manner as was pellet 15a insofar as its movement onto the transfer section 100 of the carriage assembly is concerned. Thus, FIGS. 14 and 15 illustrate the shifting of the pallet 15d from the conveyor 1 to the transfer mechanism 4 while the pallet 15a remains in the work station for treatment of the workpiece carried by the pallet 15a. Following shifting of the pallet 15d to the transfer apparatus, the pallet 15d remains in a rest position shown in FIG. 15 while treatment of the workpiece 15a proceeds, other pallets (typified by the pallet 15e) being conveyed past the work station.

Upon completion of the treatment of the workpiece carried by the pallet 15a, switches will be closed (by a part of the workpiece treating mechanism) to effect withdrawal of the locking rods 123 and to energize the motors 108a and 121 so as to drive the associated rollers in a reverse direction to move the pallet 15a out of the work station via the pathway 116 and onto the transfer section 101 which, as is shown in FIG. 15, is in register with the pathway 116 when the carriage is in its initial position.

Figure 16:
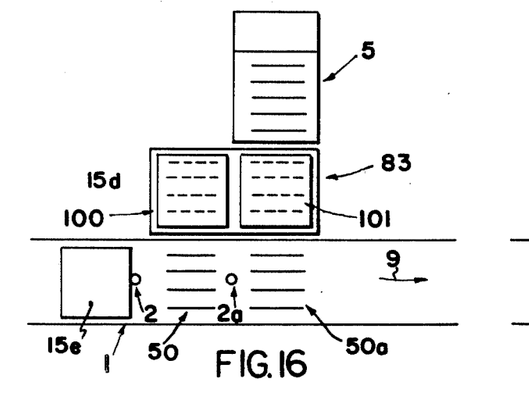
Figure 17:
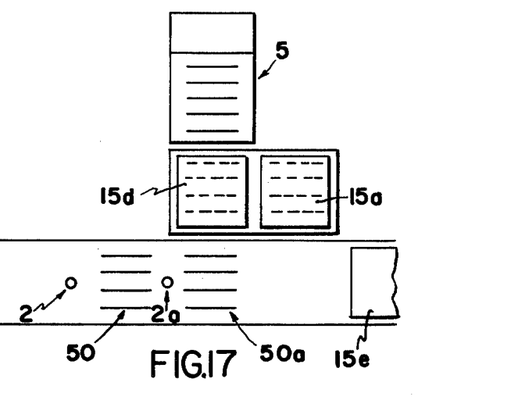
Figure 18:
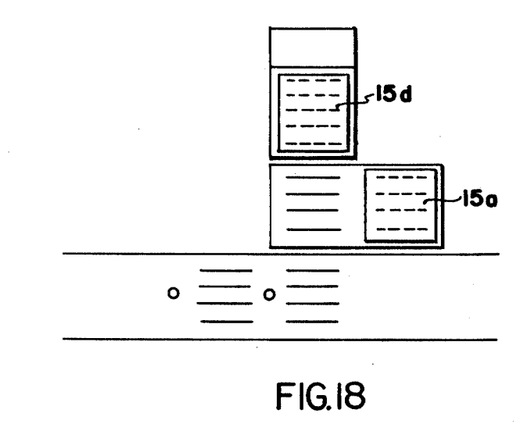

When the pallet 15a has been delivered to the transfer section 101, as indicated in FIG. 16, it engages a switch which deenergizes the motors 108a and 121 and engages another switch which energizes the ram 88 to shift the carriage assembly 83 from the position shown in FIG. 16 to the position shown in 17 and in which the pallet 15d is in register with the pathway 116. The pallet 15d then is driven into the work station in the same manner as was pallet 15a. Meanwhile, pallets on the conveyor 1 continue to be conveyed past the work station.

Figure 19:
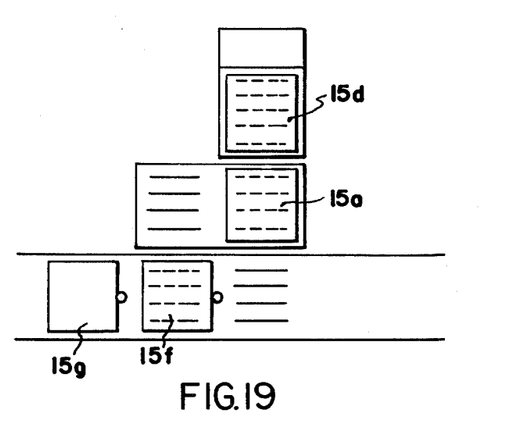

Following delivery of the pallet 15d into the work station, the carriage assembly 83 is returned to its initial position, as shown in FIG. 19, with the transfer section 100 vacant so as to be capable of receiving another pallet to be treated in the work station 5. In this position of the carriage assembly 83, the transfer section 101 will be occupied by the pallet 15a. In one embodiment the movement of the pallet 15a containing a finished workpiece to the transfer section 101 will close a switch which actuates the downstream stop 2a to raise the latter and arrest the movement of oncoming pallets so as to clear a space on the conveyor for the pallet 15a. It is preferred, however, that return of the pallet 15a to the conveyor be effected in conjunction with the movement of a pallet containing an untreated workpiece from the conveyor to the transfer section 100, thereby interrupting movement of pallets along the conveyor the least number of times. Simultaneous transfer of pallets from the conveyor to the transfer carriage and from the latter to the conveyor is illustrated in FIG. 19. Movement of a pallet containing a treated workpiece from the transfer section 101 to the conveyor is initiated by movement of the stop 2a to its raised position with consequent energization of the ram 54 of the downstream shifter 50a to raise the latter and close a switch in circuit with the motor 108a to reenergize the latter and drive the rollers 104 in a direction to transfer the pallet 15a onto the shifter 50a for subsequent return to the conveyor 1. Upon return of the pallet 15a to the conveyor, it engages a switch to deenergize the ram 54 of the shifter 50a to lower the latter and position the pallet 15a on the conveyor.

During the return of the pallet 15a to the conveyor 1 treatment of the workpiece on the pallet 15d proceeds in the work station 5. Thus, the treatment of the workpiece on the pallet 15d is not delayed by the return of the pallet 15a to the conveyor.

Figure 20:
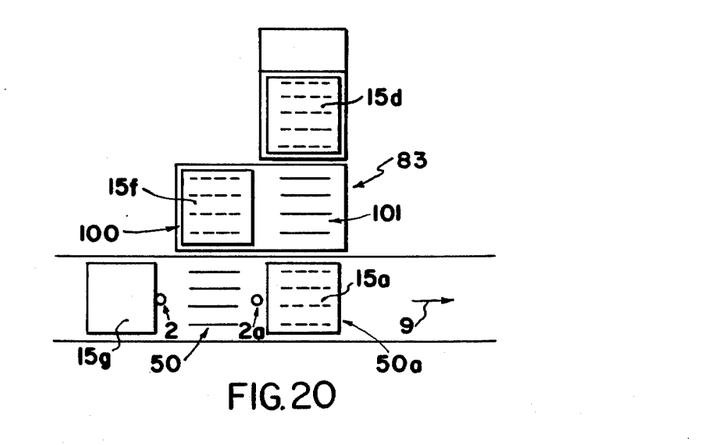

FIG. 20 illustrates the pallet 15a on the conveyor, the pallet 15d in the work station, the pallet 15f on the transfer assembly 83 in readiness to be delivered into the work station following completion of the treatment of the workpiece on the pallet 15d, in the same manner described earlier, and a further pallet 15g moving along the conveyor path 9 for delivery to the first available transfer mechanism of a work station.

This disclosure is representative of presently preferred methods and apparatus, but is intended to be illustrative rather than definitive of the invention. The invention is defined in the claims.

What is claimed is:

1. In material handling apparatus of the kind including a conveyor for conveying articles along a continuous path extending toward, alongside, and beyond a work station located adjacent one side of said conveyor and between the ends of said path, means forming a pathway leading into and out of said work station, and means upstream from said work station for shifting articles off and to said one side of said conveyor, the improvement comprising support means independent of said conveyor and said pathway at said one side of said conveyor for receiving an article shifted off said conveyor and supporting such article in an initial position upstream from said pathway while others of said articles continue to be conveyed along said path; means for transferring such article from said initial position to a second position in register with said pathway; means for moving such article from said second position into said work station via said pathway; means for returning said transferring means to said initial position following movement of such article into said work station, thereby enabling said support means to receive another article from said conveyor while the first-mentioned article is at said work station; and means for returning such first-mentioned article from said work station to said conveyor between the ends of its path.

2. Apparatus according to claim 1 wherein the means for returning such first-mentioned articles to said conveyor includes said transferring means.

3. Apparatus according to claim 1 including stop means movable into and out of the path of articles on said conveyor to stop a selected article; and means for moving said stop means into and out of said path.

4. Apparatus according to claim 3 wherein the means for moving said stop means is yieldable.

5. Apparatus according to claim 3 wherein said stop means is yieldable in the direction of movement of articles on said conveyor.

6. Apparatus according to claim 3 including second stop means upstream of the first-mentioned stop means and movable into said path to stop an article trailing said selected article; and means for moving said second stop means into and out of said path in timed relation with such movement of said first-mentioned stop means.

7. Apparatus according to claim 1 including locking means at said work station for releasably locking an article therein; and means for moving said locking means into and out of locking engagement with an article in said work station.

8. Material handling apparatus comprising means forming a work station; means forming a pathway into said work station; an elongate conveyor for conveying articles along a continuous path leading toward, alongside, and beyond said work station; means upstream from said work station for shifting an article off said conveyor; transfer means independent of said conveyor and having first and second article supports spaced from one another for supporting articles shifted off said conveyor while others of said articles continue to be conveyed along said path; means mounting said transfer means to one side of and between the ends of said conveyor path for movement towards said work station from an initial position upstream from said pathway in which one of said supports is enabled to receive an article shifted off said conveyor by said shifting means to a second position in which said one of said supports is in register with said pathway, the spacing between said supports being such that the other of said supports is in register with said pathway and is enabled to receive an article from said work station when said transfer means is in said initial position; and means for moving said transfer means from said initial position to said second position, and return.

9. Apparatus according to claim 8 wherein said first support includes driven means for imparting movement to an article carried by said first support; and means for driving said driven means.

10. Apparatus according to claim 8 wherein said second support includes driven means for imparting movement to an article carried by said second support, and means for driving said second driven means.

11. In material handling apparatus of the kind including a conveyor having an article-supporting run for conveying articles along a path, a work station mounted at one side of and alongside said conveyor between the ends of said run, means forming a pathway leading into and out of said work station, means for shifting successive selected articles off and to said one side of said conveyor, means for moving articles shifted off said conveyor into and out of said work station via said pathway, and means for returning articles moved out of said work station to said conveyor run between the ends of the latter, the improvement comprising article support means independent of said conveyor and said pathway mounted adjacent said one side of said conveyor for receiving a second selected article shifted off said conveyor run while a first selected article is in said work station and supporting said second article in a rest position out of register with said pathway while others of said articles are conveyed along said path; and transfer means for moving said second article from said rest position into register with said pathway following movement of said first article out of said work station.

12. Apparatus according to claim 11 wherein said transfer means moves said second article into register with said pathway prior to the return of said first article to said conveyor run.

13. Apparatus according to claim 11 wherein said article support means has a portion thereof in register with said pathway when said support means supports said second article in said rest position for receiving and supporting said first article following movement of the latter out of said work station.

14. A method of transferring articles from an elongate conveyor to a work station adjacent said conveyor and returning said articles to said conveyor, said method comprising conveying articles in succession along a path leading to, alongside, and beyond said work station; shifting a first selected article off said conveyor and to one side of said conveyor between its ends onto a carriage capable of supporting at least two of said articles; continuing the conveying of others of said articles along said path; moving said carriage alongside said conveyor from an initial position to a second position in which said first selected article is adjacent said work station; moving said first selected article into said work station while said carriage is in said second position; returning said carriage to said initial position; shifting a second selected article off said conveyor and to said one side of said path onto said carriage while said first article is in said work station; continuing the conveying of others of said articles along said path; moving said first selected article from said work station onto said carriage following return movement of the latter to its initial position; moving said carriage to its second position following its reception of said first selected article from said work station; moving said second selected article into said work station while said carriage is in its second position; and returning said first selected article to said conveyor.

15. A method of transferring articles from an elongate conveyor to a work station and return, said method comprising conveyor articles in succession along a path leading to, alongside, and beyond said work station; shifting a first selected article off said conveyor between its ends; moving said first selected article in a first direction leading into said work station while continuing to convey others of said articles along said path; shifting a second selected article off said conveyor between its ends following movement of said first selected article into said work station and supporting said second selected article in a rest position off said conveyor while said first selected article is in said work station and while continuing to convey others of said articles along said path; removing said first selected article from said work station in a direction opposite said first direction; moving said second selected article into said work station; and returning said first selected article to said conveyor between its ends.

16. The method according to claim 15 wherein said first selected article is returned to said conveyor following movement of said second selected article into said work station.

17. A method of transferring articles from a conveyor having a continuous article supporting run extending to, alongside and beyond a work station adjacent said conveyor, and return, said method comprising moving articles on said conveyor in succession along said run; interrupting movement of said articles and moving a first selected article off said conveyor run between the ends of said run; continuing the movement of others of said articles along said run following the movement of said selected article off said run; positioning said first article in register with a pathway extending into said work station; moving said first selected article in a direction leading into said work station via said pathway; interrupting movement of said others of said articles along said run and moving a second selected article off said conveyor run between the ends of the latter and supporting said second selected article in a rest position out of register with said pathway while said first selected article is in said work station; continuing the movement of others of said articles along said run following the movement of said second selected article off said run; moving said first selected article in the opposite direction leading out of said work station via said pathway; moving said second selected article from said rest position into register with said pathway following movement of said first selected article out of said work station; moving said second selected article into said work station via said pathway; and returning said first selected article to said conveyor run between its ends.

18. A method according to claim 17 wherein said first selected article is returned to said conveyor following movement of said second selected article into said work station.

* * * * *

UNITED STATES PATENT AND TRADEMARK OFFICE
CERTIFICATE OF CORRECTION

PATENT NO. : 4,144,960
DATED : March 20, 1979
INVENTOR(S) : George Scourtes

It is certified that error appears in the above—identified patent and that said Letters Patent are hereby corrected as shown below:

Column 1, line 25, change "fo" to --of --.

Column 1, line 44, change "of" to -- or --.

Column 3, line 58, change "large" to -- larger --.

Column 8, line 67, insert -- thus - - second occurrence after "15b".

Column 9, line 57, change "pellet" to -- pallet --.

Column 13, line 9, change "conveyor" to -- conveying --.

Signed and Sealed this

Seventeenth Day of July 1979

[SEAL]

Attest:

LUTRELLE F. PARKER
*Attesting Officer*   *Acting Commissioner of Patents and Trademarks*